United States Patent [19]
Ellis

[11] Patent Number: 4,611,877
[45] Date of Patent: Sep. 16, 1986

[54] OPTICAL PROJECTORS FOR HEAD UP DISPLAYS

[75] Inventor: Stafford M. Ellis, West Sussex, England

[73] Assignee: GEC Avionics Limited, England

[21] Appl. No.: 763,965

[22] Filed: Aug. 9, 1985

[30] Foreign Application Priority Data

Aug. 31, 1984 [GB] United Kingdom ............... 8422033

[51] Int. Cl.[4] ............................................. G02B 27/14
[52] U.S. Cl. ................................................... 350/174
[58] Field of Search ............... 350/174, 286, 287, 447

[56] References Cited

U.S. PATENT DOCUMENTS 2,983,183  5/1961  Pickering ........................... 350/174
3,526,447  6/1966  Wynne ................................ 350/174

FOREIGN PATENT DOCUMENTS 2006981  5/1979  United Kingdom ............... 350/174

*Primary Examiner*—John K. Corbin
*Assistant Examiner*—Vincent J. Lemmo
*Attorney, Agent, or Firm*—Kirschstein, Kirschstein, Ottinger & Israel

[57] ABSTRACT

An optical projector (11) for a head-up display wherein light from a data source (15) passes through a first lens arrangement (23) and then into a wedge-shaped body (27) via a first face (29) of the body wherein the light is, in turn, internally reflected at second and third angled faces of the body (35 and 33) and then exits the body at the second face (35) to pass via a second lens arrangement (25) to the system combining (13) in a direction at an angle to that which light enters the body.

The arrangement of the projector facilitates the projector having lateral dimensions dictated by the data source (e.g. a CRT) rather than the optical elements of the projector.

5 Claims, 2 Drawing Figures

OPTICAL PROJECTORS FOR HEAD UP DISPLAYS

This invention relates to optical projectors for head-up displays.

More particularly, the invention relates to such optical projectors wherein: light from a luminous data source is projected and collimated by means of spaced first and second lens arrangements, the second lens arrangement, that is the lens arrangement further from the said source having its optical axis inclined with respect to the optical axis of the first lens arrangement, that is the lens arrangement nearer to the said source: and between the first and second lens arrangements there is provided reflector means for deflecting rays from the first lens arrangement to the second lens arrangement for transmission thereby. Such an optical projector is hereafter referred to as an optical projector of the kind specified.

It is an object of the present invention to provide an optical projector of the kind specified which may be constructed so as to be of relatively compact form compared with known optical projectors of the kind specified.

According to the present invention in an optical projector of the kind specified the said reflector means comprises a body of light refractive material having a light input face via which light enters the body from an output surface of the first lens arrangement and two further faces which define a wedge-shaped portion of the body extending across a light input surface of the second lens arrangement, one of said two further faces having a mirror coating thereon and the wedge angle and orientation of the wedge-shaped portion of the body being such that light entering the body from the first lens arrangement undergoes critical angle reflection at the other of said two further faces to the said one further face from whence, after reflection, it is transmitted, without substantial reflection, by the said other further face to the second lens arrangement for transmission thereby.

The said other further face may be provided with a mirror coating over a region where light rays incident thereon from the first lens arrangement are at angles of incidence less than the critical angle of the material of the body.

The invention also provides a head-up display display head incorporating an optical projector according to the invention.

One display head in accordance with the invention will now be described by way of example with reference to the accompanying drawings in which.

Figure 1:
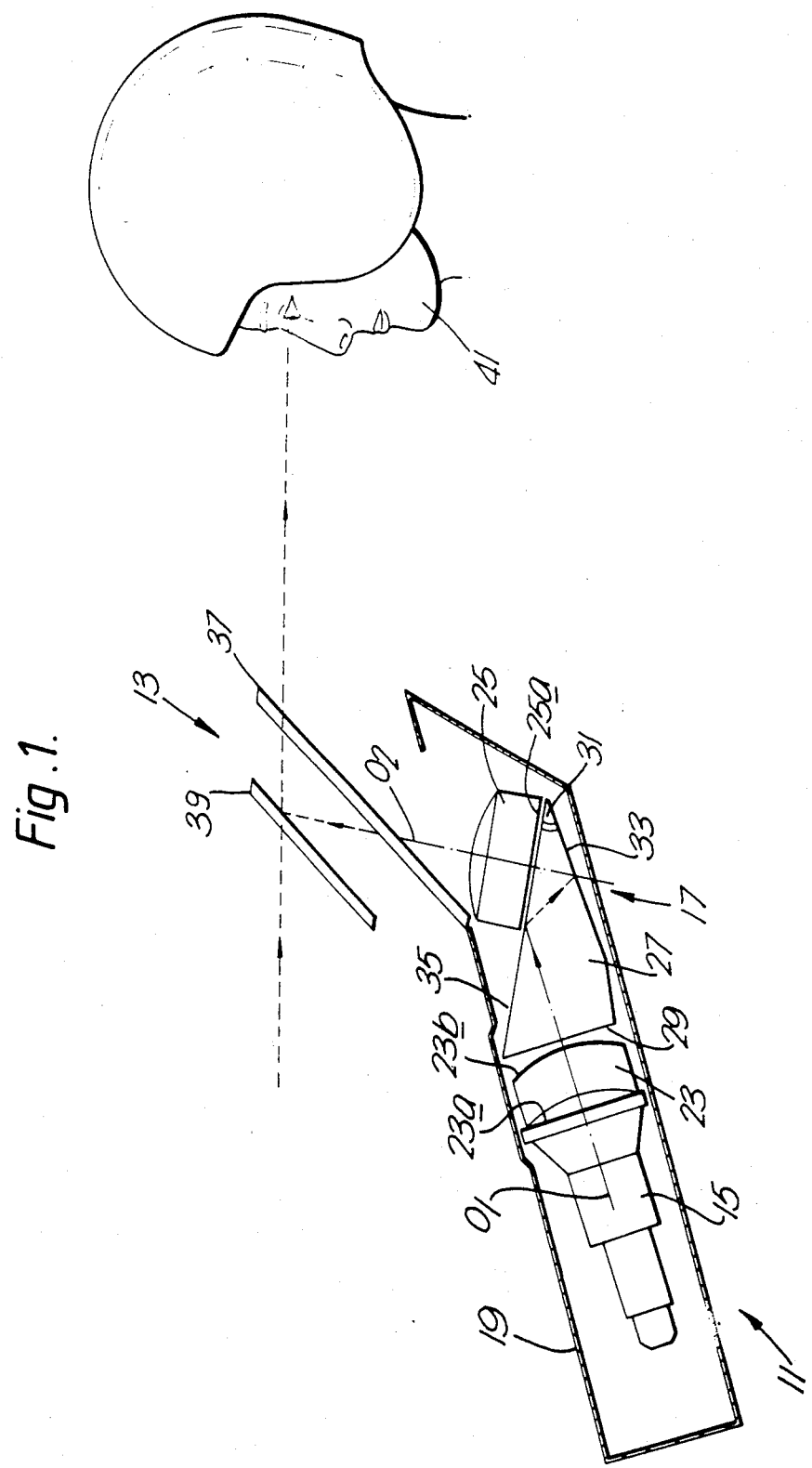
FIG. 1 is a diagram illustrating the general layout of the display head.

Referring to FIG. 1, the display head comprises an optical projector 11 and a combiner arrangement 13. The projector 11 comprises a cathode ray tube (CRT) 15 and a collimating optical system 17 supported within a housing 19. The active optical elements of the collimating system 17 comprise two serially spaced apart lens clusters 23 and 25. The first lens cluster 23 has an input surface 23a closely adjacent to the screen of the CRT 15. The optical axis $0_2$ of the second lens cluster 25 is inclined at an angle of about 60° to the optical axis $0_1$ of the first lens cluster 23.

In the space between the two lens clusters 23, 25 there is a reflector means in the form of a wedge-shaped body 27 of glass by means of which light rays from the output face 23b of the first lens cluster 23 are directed to an input face 25a of the second lens cluster 25.

An input face 29 of the wedge-shaped body 27 is normal to the optical axis $0_1$ of the lens cluster 23. The body 27 has a wedge angle 31 of about 30° defined by faces 33 and 35 extending across the input face 25a of the second lens cluster 25. The face 33 of the body is fully reflective, being provided with a mirror coating thereon. The face 35 of the body is closely adjacent to the input surface 25a of the lens cluster 25 and is normal to its optical axis $0_2$.

The display head has a frame (not shown) fixed to the housing 19 and supporting the combiner arrangement 13 which in this particular example comprises two elements 37, 39 of conventional form in spaced apart parallel relationship, such a dual element arrangement serving to extend the field of view compared with a single element arrangement.

In operation, light rays from the screen of the CRT 15 pass through the first lens cluster 23 and enter the body 27 via the input face 29. Within the body 27 the light rays are reflected at the face 35 towards the face 33 where they are reflected back to the face 35, the rays reflected from face 33 passing through the face 35 to the second lens cluster 25. After passing through the lens cluster 25 the light rays are reflected at the combiner arrangement 13 to provide an observer 41 with a collimated image of the luminous data presented on the CRT screen superimposed on his view through the combiner arrangement 13.

It will be appreciated that at least over the region of the face 35 through which rays reflected from the face 33 pass, reflection of rays from the first lens cluster 23 must be by way of critical angle reflection. However, over the rest of the face 35 i.e. in the region nearer the input face 29 of the body 27, where light rays from the first lens cluster may be incident at angles less than the critical angle for glass to air, the face 35 may be provided with a mirror coating to render it fully internally reflective.

A particular merit of an optical projector according to the invention is that without reducing the total and instantaneous fields of view available to the observer its maximum dimension in the general direction of the optical axis of the second lens arrangement, i.e. its maximum lateral dimension, may be made smaller than in known forms of optical projector of the kind specified wherein the reflector means is a plane mirror.

Figure 2:
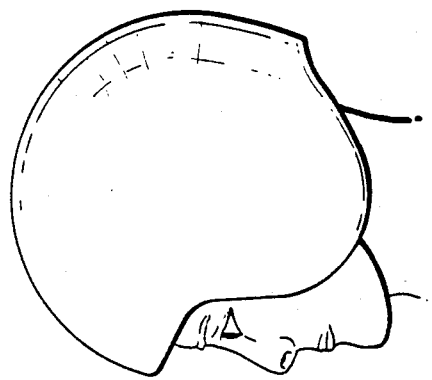
FIG. 2 is a diagram illustrating the general layout of a display head incorporating an optical projector of the kind specified of known form.
Figure 2:
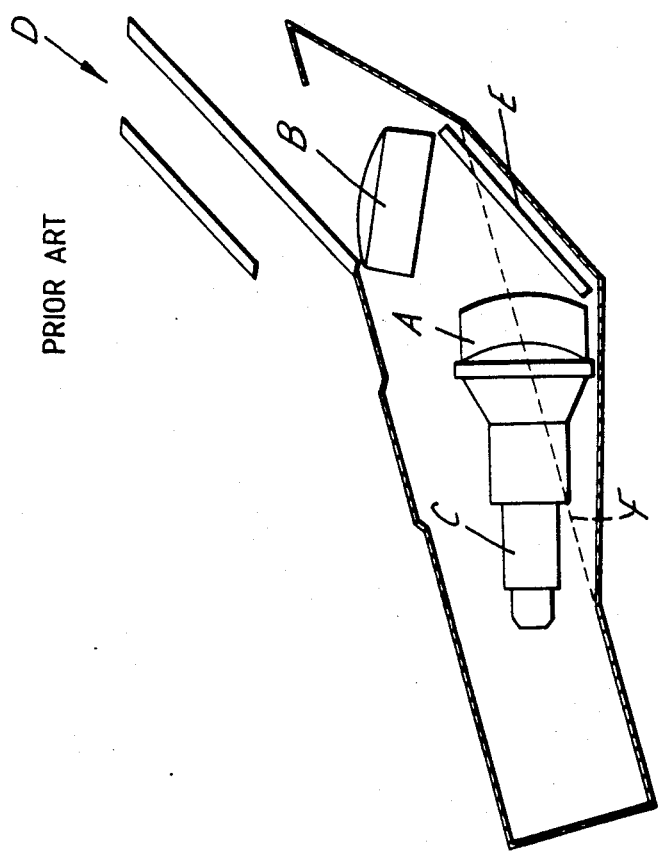

This is illustrated by FIG. 2 which shows a known form of optical projector of the kind specified using lens clusters A and B of the same characteristics as the lens clusters 23 and 25 of FIG. 1, and a CRT C and a combiner arrangement D of the same type as the CRT 15 and combiner arrangement 13 of FIG. 1, but employing a reflector means in the form of a mirror E instead of the wedge-shaped glass block 27 of FIG. 1. As can be seen by comparison of FIGS. 1 and 2, to achieve comparable performance to that obtained with the FIG. 1 arrangement, the maximum dimension of the FIG. 2 arrangement in the direction of the optical axis of the lens cluster B must be substantially greater than in the FIG. 1 arrangement, as indicated by dotted line F in FIG. 2. Indeed, as in the arrangement of FIG. 1, in a projector according to the invention the lateral dimensions of the projector may be dictated by the luminous data source rather than the optical elements of the projector so that the maximum lateral dimension may be not substantially greater than the corresponding dimension of the luminous data source, thus providing an optical projector of slim lateral dimensions. It will be appreciated that this is of particular advantage, for example, in head-up display systems for use in high performance aircraft where space is at a premium.

I claim:

1. An optical projector comprising a luminous data source and means for projecting and collimating light from the data source comprising a first lens arrangement having an optical axis arranged to receive light from the data source, a second lens arrangemnt having an optical axis inclined with respect to the optical axis of the first lens arrangement, and reflector means between the first and second lens arrangements arranged to deflect rays from the first lens arrangement to the second lens arrangement for transmission thereby, the reflector means comprising a body of light refractive material having a light input face via which light enters the body from an output surface of the first lens arrangement and two further faces which define a wedge-shaped portion of the body extending across a light input surface of the second lens arrangement, one of said two further faces having a mirror coating thereon and the wedge angle and orientation of the wedge-shaped portion of the body being such that light entering the body from the first lens arrangement undergoes critical angle reflection at the other of said two further surfaces to the said one further face from whence, after reflection, it is transmitted, without substantial reflection, by the said other further face to the second lens arrangement for transmission thereby.

2. An optical projector according to claim 1 wherein said other further face is provided with a mirror coating over a region where light rays incident thereon from the first lens arrangement are at angles of incidence less than the critical angle of the material of the body.

3. An optical projector according to claim 1 wherein said wedge portion of the body is an end portion of the body.

4. An optical projector according to claim 1 wherein the maximum dimension of the projector arrangement in the general direction of the optical axis of the second lens arrangement is not substantially greater than the dimension of the luminous data source in the corresponding direction.

5. A head-up display head incorporating an optical projector according to claim 1.

* * * * *

(12) REEXAMINATION CERTIFICATE (4644th)
United States Patent
Ellis

(10) Number: US 4,611,877 C1
(45) Certificate Issued: Sep. 17, 2002

(54) OPTICAL PROJECTORS FOR HEAD UP DISPLAYS

(75) Inventor: Stafford M. Ellis, West Sussex (GB)

(73) Assignee: BAE Systems Electronics Limited, Farnborough (GB)

Reexamination Request:
No. 90/006,072, Jul. 27, 2001

Reexamination Certificate for:
Patent No.: 4,611,877
Issued: Sep. 16, 1986
Appl. No.: 06/763,965
Filed: Aug. 9, 1985

(30) Foreign Application Priority Data

Aug. 31, 1984 (GB) ............................................ 8422033

(51) Int. Cl.$^7$ ................................................ G09G 5/00
(52) U.S. Cl. .......................................... 345/7; 359/630
(58) Field of Search ..................... 345/7, 8, 9; 359/630, 359/634, 833

(56) References Cited

U.S. PATENT DOCUMENTS 3,987,299 A 10/1976 Mulder

FOREIGN PATENT DOCUMENTS

| GB | 1303503 | 1/1973 | ........... G02B/27/10 |
| GB | 1533859 | 11/1978 | ........... G02B/23/10 |

*Primary Examiner*—Amare Mengistu

(57) ABSTRACT

An optical projector (11) for a head-up display wherein light from a data source (15) passes through a first lens arrangement (23) and then into a wedge-shaped body (27) via a first face (29) of the body wherein the light is, in turn, internally reflected at second and third angled faces of the body (35 and 33) and then exits the body at the second face (35) to pass via a second lens arrangement (25) to the system combining (13) in a direction at an angle to that which light enters the body.

The arrangement of the projector facilitates the projector having lateral dimensions dictated by the data source (e.g. a CRT) rather than the optical elements of the projector.

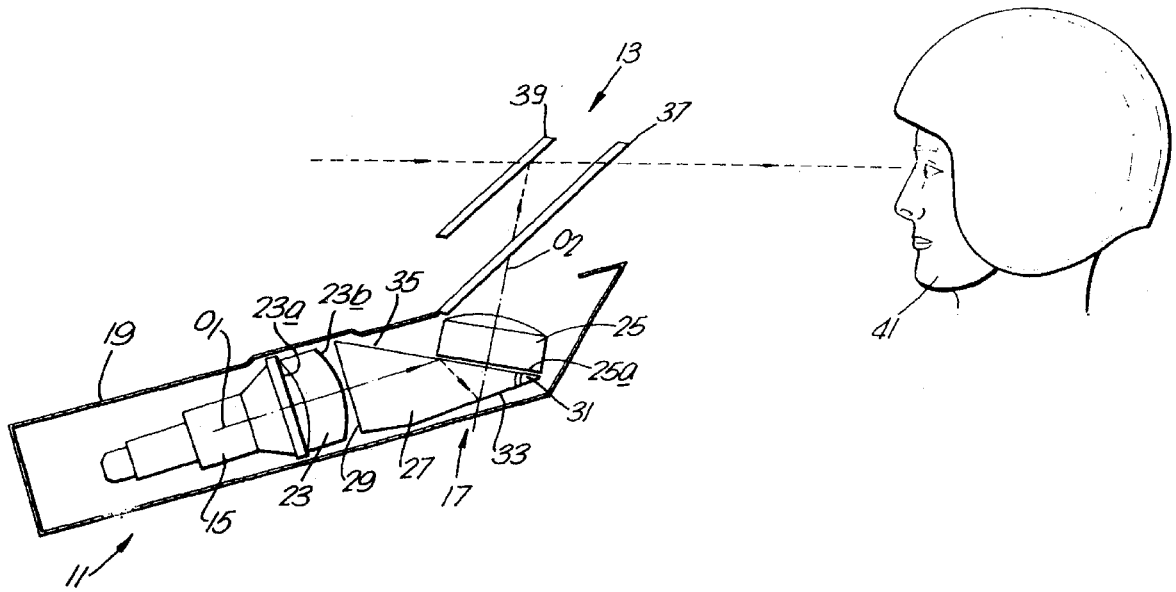

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5 is confirmed.

New claims 6-13 are added and determined to be patentable.

*6. A head-up display head according to claim 5, further including a combiner reflecting the transmitted light from said second lens arrangement to an observer.*

*7. A head-up display head according to claim 6, wherein said combiner is a partially reflecting dual element combiner.*

*8. A head-up display head according to claim 6, wherein said combiner includes at least one partially reflective plate.*

*9. A head-up display head according to claim 8, wherein said at least one partially reflective plate comprises an optically flat plate.*

*10. A head-up display for displaying data superimposed upon the view of an observer, said display comprising:*

*a luminous data source;*

*means for projecting and collimating light from the data source comprising*

*a first lens arrangement having an optical axis arranged to receive light from the data source,*

*a second lens arrangement having an optical axis inclined with respect to the optical axis of the first lens arrangement, and*

*reflector means between the first and second lens arrangements arranged to deflect rays from the first lens arrangement to the second lens arrangement for transmission thereby, the reflector means comprising*

*a body of light refractive material having a light input face via which light enters the body from an output surface of the first lens arrangement and*

*two further faces which define a wedge-shaped portion of the body extending across a light input surface of the second lens arrangement, one of said two further faces having a mirror coating thereon and the wedge angle and orientation of the wedge-shaped portion of the body being such that light entering the body from the first lens arrangement undergoes critical angle reflection at the other of said two further surfaces to the said one further face from whence, after reflection, it is transmitted, without substantial reflection, by the said other further face to the second lens arrangement for transmission thereby; and*

*a combiner reflecting the transmitted light from said second lens arrangement to said observer.*

*11. A head-up display according to claim 10, wherein said combiner is a partially reflecting dual element combiner.*

*12. A head-up display according to claim 10, wherein said combiner includes at least one partially reflective plate.*

*13. A head-up display according to claim 12, wherein said at least one partially reflective plate comprises an optically flat plate.*

\* \* \* \* \*